(12) United States Patent
Shagam

(10) Patent No.: US 6,397,295 B1
(45) Date of Patent: May 28, 2002

(54) CACHE MECHANISM FOR SHARED RESOURCES IN A MULTIBUS DATA PROCESSING SYSTEM

(75) Inventor: Eli Shagam, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/225,033

(22) Filed: Jan. 4, 1999

(51) Int. Cl.[7] ............................................. G06F 12/00
(52) U.S. Cl. ...................... 711/121; 711/148; 711/152
(58) Field of Search ................................. 711/121, 124, 711/147, 148, 149, 150, 152

(56) References Cited

U.S. PATENT DOCUMENTS

| | | | |
|---|---|---|---|
| 4,897,786 A | | 1/1990 | Pimm et al. |
| 4,933,835 A | | 6/1990 | Sachs et al. |
| 5,175,826 A | | 12/1992 | Begun et al. |
| 5,182,809 A | | 1/1993 | Begun et al. |
| 5,287,484 A | * | 2/1994 | Nishii et al. ................. 711/144 |
| 5,386,517 A | | 1/1995 | Sheth et al. |
| 5,511,224 A | | 4/1996 | Tran et al. |
| 5,517,626 A | | 5/1996 | Archer et al. |
| 5,553,249 A | | 9/1996 | Datwyler et al. |
| 5,553,266 A | * | 9/1996 | Metzger et al. .............. 711/144 |
| 5,572,703 A | | 11/1996 | MacWilliams et al. |
| 5,640,600 A | | 6/1997 | Satoh et al. |
| 5,659,696 A | | 8/1997 | Amini et al. |
| 5,737,756 A | | 4/1998 | White et al. |
| 5,752,260 A | | 5/1998 | Liu |
| 5,764,932 A | | 6/1998 | Gochman et al. |
| 5,787,459 A | | 7/1998 | Stallmo et al. |
| 5,809,533 A | | 9/1998 | Tran et al. |
| 5,822,767 A | * | 10/1998 | MacWiliams et al. ....... 711/146 |
| 6,157,977 A | * | 12/2000 | Sherlock et al. ............ 710/129 |

* cited by examiner

*Primary Examiner*—Matthew Kim
*Assistant Examiner*—Matthew D. Anderson
(74) *Attorney, Agent, or Firm*—Hale and Dorr LLP

(57) ABSTRACT

The invention relates to a data processing system and method wherein a data processing system is connected to at least two busses, each of which is connected to a memory system. Controllers connected to one of the buses monitor the write operations at each other bus. The monitoring controllers are each connected to less then all of the lines of the "other bus" and continuously update their cache memories to reflect and maintain the integrity of the data in the cache memory.

18 Claims, 5 Drawing Sheets

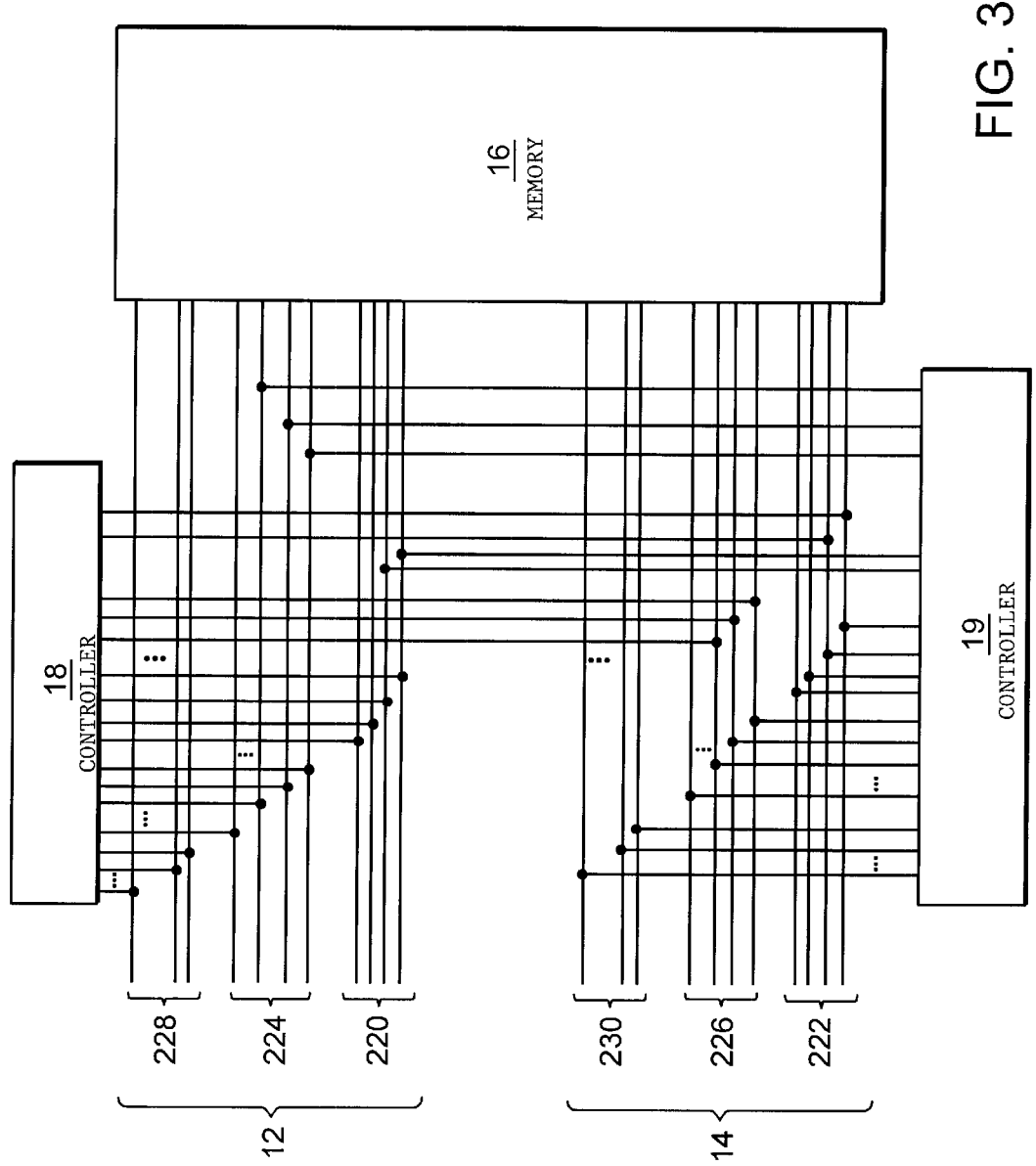

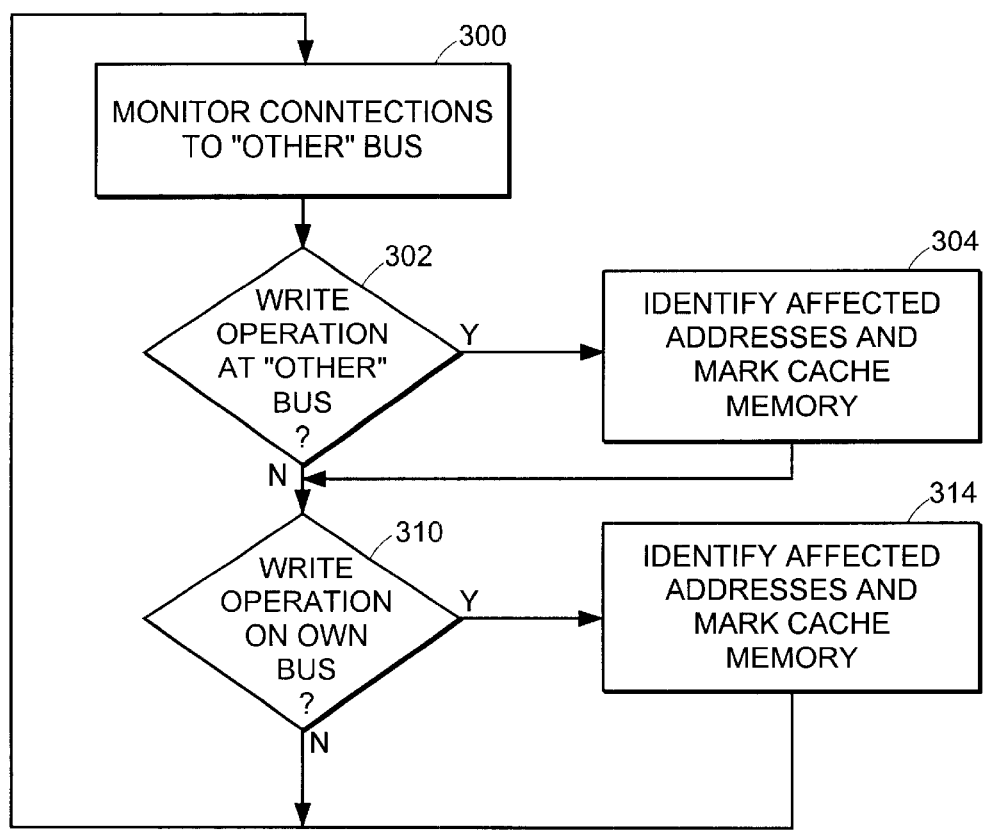

CACHE MECHANISM FOR SHARED RESOURCES IN A MULTIBUS DATA PROCESSING SYSTEM

BACKGROUND OF THE INVENTION

This invention relates generally to data processing systems and more particularly to a method and apparatus for simplifying data caching in memory systems accessible from more than one data bus.

As is known in the art, data processing systems generally include several types of processing resources which can be interconnected by one or more communications buses. In addition to the processor resources, data processing systems also generally include some sort of memory which is typically shared among the processor resources. As is common in many computer systems, these processing resources can act independently to perform different processing tasks. Since each of the processing resources can act independently, there may arise situations where there are common needs for certain shared memory resources within the system.

One example of a data processing system which includes several processing resources coupled to a common memory over two or more buses is a data storage system such as the Symmetrix family of data storage systems manufactured by EMC Corporation. These storage systems are typically capable of being coupled to several different host computers at any given time and provide storage services to each of those computers independently. In order to support simultaneous transactions among a plurality of host computers, the storage system includes several host controllers for managing the communication between the host computers and the storage system. In particular, the Symmetrix storage systems mentioned above include several disk controllers which are each responsible for managing one or more arrays of disk type storage devices.

In addition to the host controllers and disk controllers mentioned above, the storage subsystem can also contain a very large global memory which is used to manage the transfer of data from the host computers to the storage devices as well as to manage the transfer of data from the storage devices to the host computer.

During the operation of the data storage system described above, it is often necessary for any one of the host controllers or disk controllers to access data, either in the global memory or on a disk drive which another host controller or disk controller has just written.

The disk controllers and the host controllers, in order to increase their throughput, can often include cache memories which store data to be written to either global memory or a disk drive, or which store data which has just been read from global memory or a disk drive. In the latter instance, in particular, if a second request for data is received and is, for example, the same as or located physically near to a previous request for data, the controller need not access global memory or the disk drive for the data but can have it immediately available from its local cache memory. Such a system advantageously increases the throughput of the device, as is well known in the field. Sometimes, situations occur in which more than one controller can write to a memory or storage device. In this instances, previously read and cached data can be "stale" if another controller or processor writes to the same location in the stored memory. If all of the write operations occur over a single bus, then each processor which can access the memory, can monitor the bus and can, whenever a write operation occurs, determine whether that write operation modifies information which, at the time of writing, was contained in its own cache memory. If it does exist in cache, the data in the cache memory can either be discarded or can be overwritten with the correct new data.

When a memory or a storage system can be accessed through two separate buses, however, it becomes more difficult to determine whether data, in the cache memory of a processor, is "stale". The processor can be connected to both buses; however, since each bus may typically have 100 or more pin terminals, and since "pin real estate" is often at a premium, it may not be practicable to connect each of two or more buses to each and every processor. As a result, the cache memory, under these circumstances, may or may not be accurate, and unless great care is taken, or substantial "pin real estate" is used, errors will occur.

Accordingly, the invention advantageously enables, with acceptable penalty, each processor in a bus memory or storage system having two or more buses, to monitor the occurrences on each bus, albeit in a different manner for each bus class, in order to determine, when or whether, data in its cache memory has become "stale". This advantageously enables better and faster access, from the plural processors and controllers, to the memory system, while at the same time enabling high speed throughput with the knowledge that no "data stale" errors will occur and that all data will be "fresh" and up to date. Other advantages of the invention include limiting the "pin real estate" required to effect monitoring of the plural buses of the system to maintain and update a processors own cache memory.

SUMMARY OF THE INVENTION

The invention relates to a data processing system having a first and a second bus, a memory system connected to be read from each of the first and second buses, at least one first bus processor being connected to the first bus for reading data from the memory system, at least one second bus processor being connected to the second bus and for writing data to the memory system, and the first bus processor having a cache memory. The invention features each first bus processor being connected to less than all of the lines of the second bus and being connected to all of the lines of the first bus and for storing in its cache data read from the memory by the processor over the first bus. The connected first bus processor invalidates or discards any data stored in its cache memory corresponding to an identified section of the memory system which, from its connections to the second bus, could have been changed by a data write occurring on the second bus by one of the second bus processors.

In particular embodiments, the data processing system features a plurality of first bus processors and a plurality of second bus processors, each processor able to read and write data from and to the memory system over its respective connected first and second bus, each processor having a cache memory for caching previously read data, and each processor connected to less than all the lines of the other bus for determining when a write operation to the memory system occurs and approximately what section of the memory system the write operation affected.

In another aspect, each processor monitors its fully connected bus for updating its cache memory as a result of write operations by other processors able to write on its bus and being connected to only those address and control lines of the second bus necessary to determine when a write operation occurs and the section of memory which is affected.

In a particular embodiment of the invention, a processor is connected to at least half of the address lines of the other bus.

In other aspects, the invention relates to a method for maintaining the integrity of a controller cache memory. The method operates in the environment of a data processing system having a first and a second bus, a memory system connected to be read from each of the first and second buses, at least a first bus processor connected to the first bus for reading data from the memory system, at least one second bus processor connected to the second bus for writing data to the memory system, and the first bus processor having a cache memory. The method features monitoring, by each first bus processor, less then all of the lines of the second bus; storing, in each connected first bus processor, in its cache memory, data read from the memory by the processor over its first bus; and invalidating data stored in the connected first bus processor cache memory which corresponds to an indicated section of the memory system which, from its monitoring of the second bus, could have been changed by a data write of one of the second bus processors. Preferably, the monitoring step monitors only a number of control lines sufficient for determining when a write operation to the memory system occurs on the other bus.

In preferred embodiments, the monitoring is performed on at least half, and at most three-quarters, of the address lines of the second bus, although more or less address lines may be monitored in other embodiments of the invention.

In another embodiment of the invention, a data processing system has a first and a second bus, a memory system connected to be read from each of the first and second buses, at least one first bus processor connected to the first bus for reading data from the memory system, at least one second bus processor connected to the second bus for writing data to the memory system, said memory system having a first cache memory associated with the first bus and a second cache memory associated with the second bus, a first processor element connected to the first bus and connected to monitor less than all of the lines of the second bus, a second processor element connected to the second bus and connected to monitor less than all the lines of the first bus, and the connected first processor element invalidating data stored in its associated cache memory corresponding to an indicated section of the memory system which, from its connections to the second bus, could have been changed by a data write of the second bus processor.

In another aspect, the invention relates to a method for maintaining the integrity of data in a controller cache memory in a data processing system having a first and second bus, a memory system connected to be read from each of the first and second buses, at least one first bus processor connected to the first bus for reading data from the memory system and at least one second bus processor connected to the second bus for writing data to the memory system. The memory system has a first cache memory associated with the first bus and a second cache memory associated with a second bus. The method features monitoring, by a first processor element of the memory system, less than all of the lines of the second bus, storing by the first processor element, in its associated cache memory, data read from the memory system over the first bus, and invalidating data stored in the first cache memory which corresponds to an indicated section of the memory system which, from monitoring of the second bus, could have been changed by a data write command of the second bus.

BRIEF DESCRIPTION OF THE DRAWING

Other objects, features, and advantages of the invention will be apparent from the drawings in which:

FIG. 3 is a detailed block diagram illustrating connections of the controller and buses;

FIG. 4 is an illustration showing memory sections and bit maps;

FIG. 5 is a flow chart illustrating operation in accordance with a preferred embodiment of the invention.

DESCRIPTION OF PREFERRED EMBODIMENTS OF THE INVENTION

Figure 1:
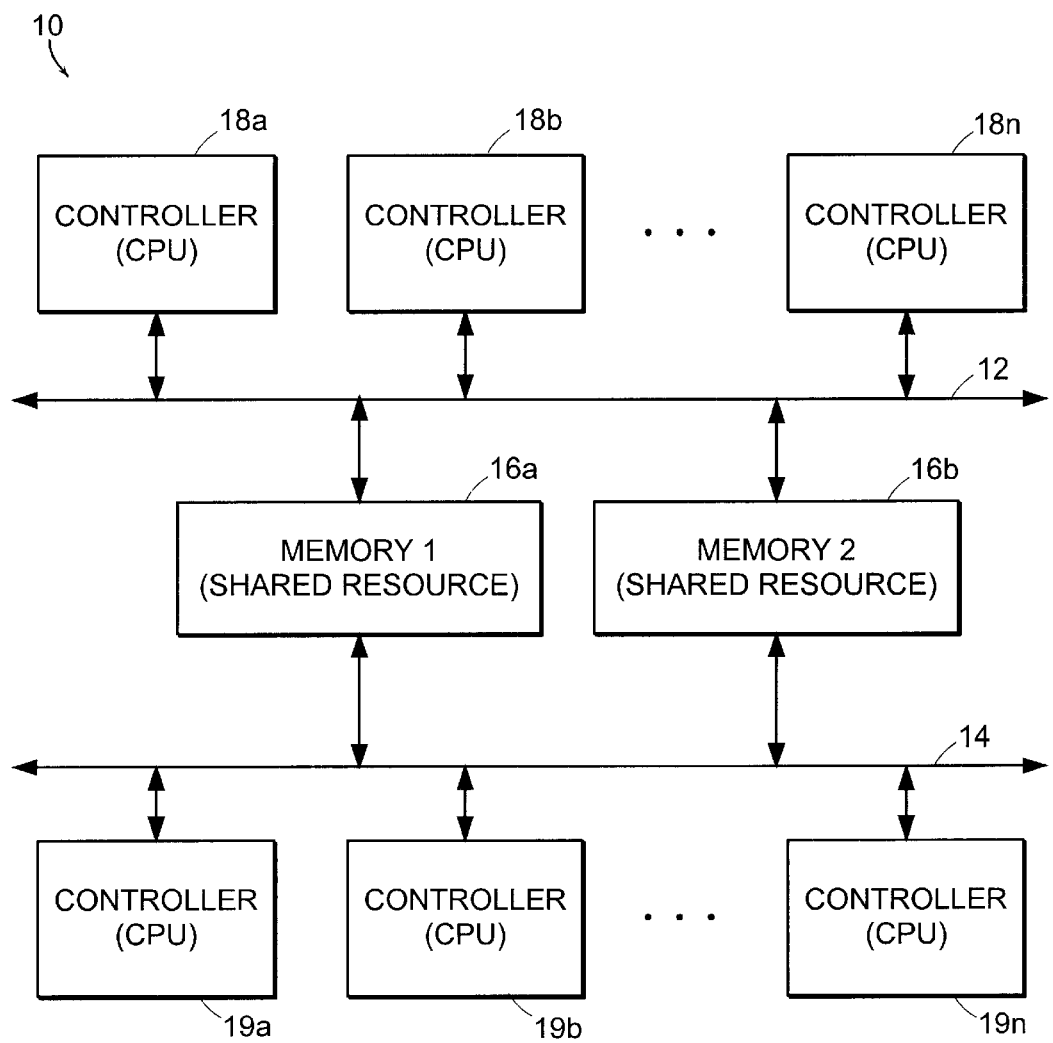
FIG. 1 is a block diagram of a data processing system in accordance with the invention.

Referring to FIG. 1, according to a particular embodiment of the invention, a data processing system 10 has a plurality of controllers or processors 18a through 18n. Each of these controllers is coupled to a first data processing bus 12. Data processing system 10 also has a second plurality of controllers or processors 19a through 19n coupled to a second data processing bus 14. Each of the controllers 18a through 18n and 19a through 19n are coupled to a first and second memory 16a and 16b through the respective buses 12 and 14. The controllers 18a through 18n and 19a through 19n can be any type of electronic device with transmits, receives or operates on computer data. (Other memory configurations, such as a single memory, and more than two data processing buses can be used.)

In the illustrated embodiment of the invention, controllers 18a through 18n are so-called host controllers and are resident within a storage subsystem. Thus, controllers 18a through 18n are used to manage the communications between a variety of host computers (not shown) and the storage system of which they are a part. Also according to the preferred embodiment, controllers 19a through 19n are so-called disk controllers which are used to manage the transfer of data between arrays of disk storage devices (not shown) and the host computers through the host controllers 18a through 18n and memories 16a and 16b. Although the present invention will be described in the context of a data storage system, the principles of the invention are equally applicable to any multi-processor data processing system incorporating a shared memory accessible from two or more buses. For example, the present invention is applicable to a multiprocessor host computer system where the processors communicate over at least two shared buses and share a global memory. (The global memory can be made up of one or more individual memories, two memories being illustrated in this embodiment.) Thus, the storage system aspects described for the preferred embodiment should not be seen as limitations of the present invention.

During the operation of data processing system 10, it is often necessary for each of the controllers 18 and 19 to access each of the memories 16a and 16b in order to perform their respective data processing functions. Since each of the memories is coupled to each of the buses 12 and 14 which are in turn coupled to each of the controllers, the memory resources are generally shared by each of the controllers within the data processing system.

Figure 2:
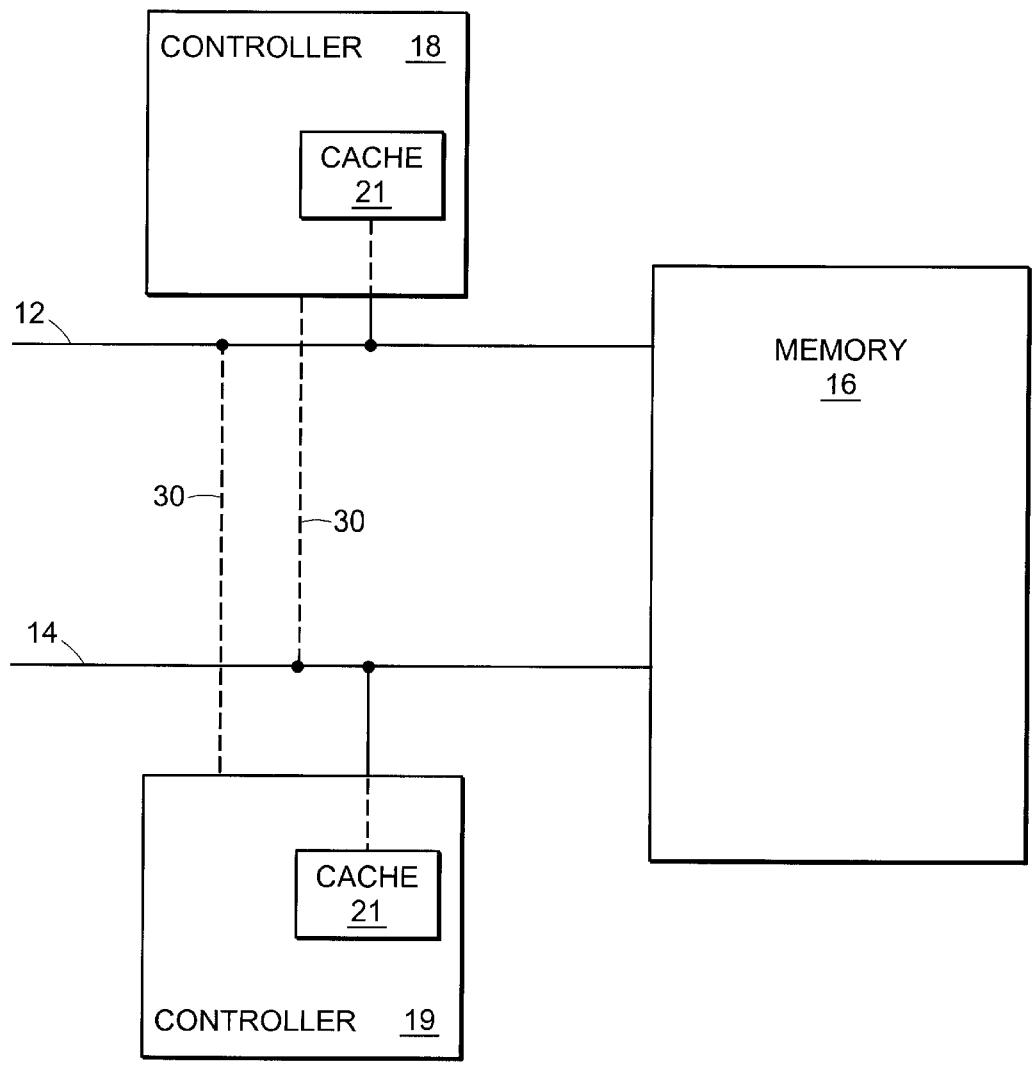
FIG. 2 is a more detailed block diagram of the data processing system of FIG. 1 showing connections between various processors and the associated bus lines.

Referring to FIG. 2, each of the controllers 18 and 19, in the illustrated embodiment of the invention, includes a cache memory 21 as is well known in the field. The purpose of the cache memory is to store data from the shared resources 16

(memories 16a and 16b) in order to reduce communications by a controller to a memory 16, and to increase controller throughput. This occurs in part by the locality of reference of many successive memory reads whereby a memory read is often stored in sequentially successive locations in memory, and therefore the later successive reads are related to previous memory reads. In the illustrated embodiment of the invention, the processors, as is well known in the art, keep track of the memory location from which data in the cache memory was retrieved (that is, the memory address) so that any requirement for obtaining data from the memories 16 is first met, if available, by the cache memory of the processor, and only thereafter, if there is a so-called "cache miss", does the processor read the needed data from the memories 16.

In a single bus system, each controller can monitor the bus to which it is fully connected and determine whether any of the data in its cache memory is being updated, that is, whether another controller is writing into memory 16 at a location corresponding to data stored in the monitoring processor's cache memory. When this occurs, the processor can "grab" that data as it is being read into memory 16 and store it also in its own cache memory so that it maintains a complete and accurate up-to-date copy of the data in its cache memory (corresponding to the updated data in corresponding locations of memory 16), that is, the memories are coherent.

This is not true, however, when, for example, a controller 18 writes to memory 16 and controller 19 cannot "see" the write because it is not connected to, in this instance, bus 12. A simple solution to the problem is to connect each controller 19 to both buses 12 and 14. This, however, poses a severe "pin real estate" problem wherein each bus, having 100 or more lines, takes up significant space at each of the controller circuities.

The invention addresses this issue by reducing the number of lines monitored by a controller on a bus which it is only monitoring.

Still referring to FIG. 2, in accordance with the invention, each controller is connected to less than all of the lines of the bus or buses which it is monitoring. In particular, each controller, over bus monitoring lines 30 connects to those lines of the monitored bus which are necessary for determining whether the data in its cache is up-to-date and accurate. Thus, a controller must connect to those lines which enable it to identify write commands to memories 16 and to those lines which provide necessary and sufficient address data to identify in which section(s) of memories 16 the write was made.

Ideally, a processor will connect to all of the address lines of the monitored bus in order to determine precisely what data is being written to memory 16. However, in accordance with the invention, in order to reduce the required "pin real estate", less than all of the address lines of the monitored bus will be connected, thus incurring a penalty at the monitoring controller as described below.

Thus, if, for example, only the "n–1" most significant address lines are monitored of an "n" bit memory address, the monitoring controller will have an ambiguity as to the least significant bit. Accordingly, the monitoring controller must assume that two memory locations, the locations having the monitored and read n–1 most significant bits, are modified and will clear its cache memory of any data corresponding to those two memory locations in order to be certain that any data in its cache memory is up-to-date.

Similarly, if the most significant "n–2" bits of an "n" bit address are monitored and read, the monitoring controller will clear the four memory locations in cache, if present, corresponding to the form memory locations in memory 16 having these n–2 most significant bits. In this manner, a sliding penalty is incurred as fewer and fewer address lines are monitored. In fact, the monitored lines need not be of the most significant address bits, but can be of the least significant address bits, or any "i" bits of an "n" bit address word so long as "i" is less than "n". In a particular embodiment of the invention, it has been found that even when only half of the address lines are monitored, a significant improvement can be achieved without significant loss in throughput performance. Therefore, for example, in a typical embodiment, which has 10 control lines, 32 address lines, and 72 data bits for a total of 104 lines or pins, it is possible to monitor only 16 of the address lines and perhaps only 5 of the control lines in order to adequately monitor a bus which the processor does not use for reading or writing data and to which it is not fully connected. This savings in "pin real estate" is significant and important as the physical size of the processors becomes smaller.

In this circumstance, while the penalty is not insignificant, the savings in "pin real estate" can fully justify the additional processing (cache misses) which may be required. In practice, it has typically been found that the amount of additional processing and loss of throughput by failure to have otherwise available data in cache memory is easily tolerable and does not significantly adversely affect overall performance of most systems.

In a specific example, referring to FIG. 3, wherein there are only four address lines (this is a simplified example for illustration purposes only), each of the controllers 18 and 19 is connected to monitor all four address lines 220, 222, respectively, of its own bus and only two of the address lines of the other bus. In this manner, in this example, only half of the address lines are monitored in order to determine the effect on memory of write commands over monitored command lines 224, 226 of the "other" bus. Note also that only those elements of the command lines necessary to determine the existence of the write command are monitored and that the data lines 228, 230 are not monitored.

Referring now to FIG. 4, a matrix 238 illustrates the sixteen addresses of addressable memory. If, for example, only the two lowest bits of the address bus are monitored, in this example, then the penalty can be viewed as follows. If the monitored two bits are "00", the write could have been to any of addresses "0000", "0100", "1000", or "1100" (column or memory section 240). Since the controller does not have any further information regarding the write address, it must assume that the write was to all of these possible addresses; and if data from any of those addresses is stored in its cache memory, then that data is considered to be "stale" and must be removed or flushed from cache. Thus, in this example, the monitored two bits cause up to four words of cache to be marked as "stale". Clearly, the percentage penalty is less for a large address space so that, for example, for an address space of 32 bits, corresponding to $2^{32}$ addresses, monitoring only half of the bits results in identifying as "stale"$2^{16}$ addresses, or $2^{-14}$ (0.00152) percent of the memory's capacity. While the monitored address lines in the example were contiguous and corresponded to the least significant bits of the address, in the general case the monitored lines need not be either contiguous or the least significant bits.

Referring now to FIG. 5, in operation, each controller continuously monitors the "other" secondary buses which can write to memory. Each controller also monitors its own (primary) bus through which other connected controllers can write to memory. The connections to the secondary buses monitor less than all of the bus lines of each secondary bus in order to save "pin real estate". This is indicated at step 300. When the controller receives an indication that a write operation is taking place on a secondary bus (step 302), the controller monitors the addresses affected and renders as "stale" any data in its cache memory corresponding to those memory addresses. This is indicated at step 304.

Each controller also, of course, monitors the activity on its own bus. If any write operation is effected by another controller on its bus, as tested at 310, the monitoring controller renders "stale" the data corresponding to the memory address identified in the write command. This is indicated at 314. The controller then loops, maintaining the integrity of its cache memory. Other operations, for example its own read and write operations, also occur during this time and can have the effect of updating and periodically changing cache memory.

Figure 6:
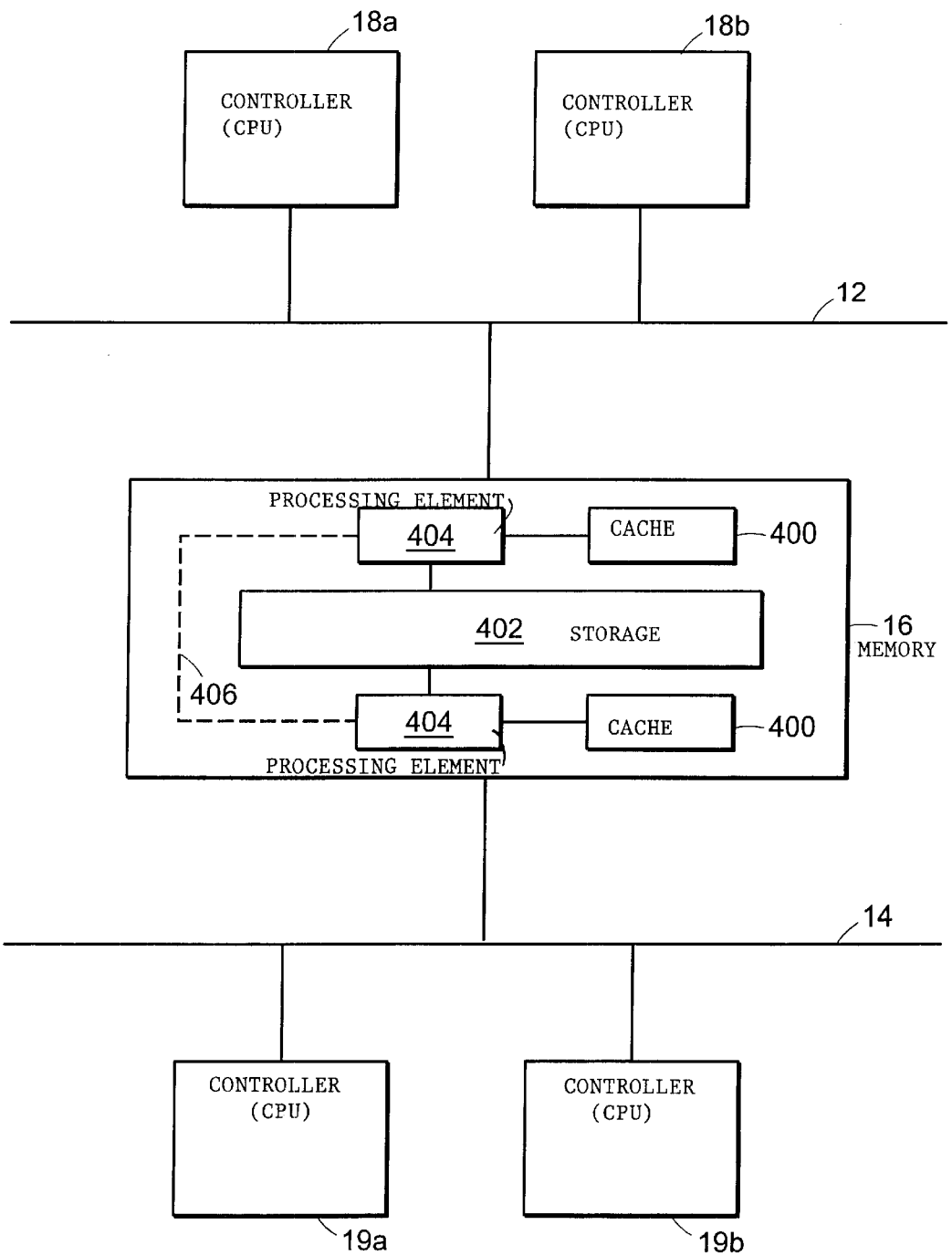
FIG. 6 is an alternate detailed block diagram of a data processing system employing the invention.

In another embodiment of the invention, rather than placing the cache memories at the controllers 18 or 19, and referring to FIG. 6, the memory system 16 can contain a cache memory 400 to be associated with each of the buses 12, 14 to which the memory system 16 is connected. In this embodiment, the memory system 16 has an active storage 402, accessed through processing elements 404 from each bus. The processing elements 404 also connect to their respective cache memories 400 and monitor the write command and address lines over lines 406. This is comparable to the address and control lines 30 (FIG. 2).

When a request over a bus either cannot access the memory 402 because it is busy, the associated cache memory 400 can be accessed if the data is available there. However, each time the data is altered in memory 402, the related cache data 400 for the non-writing bus must be disabled. This can be performed by processing elements 404 as they monitor control and address lines of the related processing elements. Since memory system 16 is often a single board memory, there is a "fight" for board space or line space which can limit the number of line 406 available on the board containing memory system 16. In this respect, therefore, the line space limitation on a single board is similar the pin real estate noted above and the same monitoring mechanisms described in connection with FIGS. 1–5 can be employed here in relation to FIG. 6.

Additions, subtractions, and other modifications of the disclosed preferred embodiments will be apparent to those practiced in this field and are within the scope of the following claims.

What is claimed is:

1. A data processing system comprising
    a first and a second bus,
    a memory system connected to be read from each of said first and second buses,
    at least one first bus processor connected to said first bus for reading data from said memory system,
    at least one second bus processor connected to said second bus for writing data to said memory system,
    said first bus processor having a cache memory,
    each first bus processor connected to at least one, but less than all of the lines of the second bus,
    said connected first bus processor storing in its cache, data read from said memory by said processor over said first bus, and
    said connected first bus processor invalidating data stored in its cache memory corresponding to an indicated section of the memory system which, from its connections to the second bus, could have been changed by a data write of a said second bus processor.

2. The data processing system of claim 1 further comprising
    a plurality of first bus processors and a plurality of second bus processors, each processor able to read and write data from and to the memory system over its respective connected first or second bus,
    each processor having a cache memory for caching previously read data, and
    each processor connected to less than all the control lines of the other bus sufficient for determining when a write operation to the memory system occurs, and what section of the memory system the write operation affected.

3. The data processing system of claim 2 wherein each processor monitors its fully connected bus for updating its cache memory as a result of write operations by other processors able to write on the connected bus.

4. The data processing system of claim 1 wherein said first bus processor is connected to those lines of the second bus sufficient to determine when a write operation occurs, and to at least half of the address lines of the second bus.

5. The data processing system of claim 1 wherein the first processor is connected to at most three-quarters of the address lines of the second bus.

6. A method for maintaining the integrity of data in a controller cache memory in a data processing system comprising
    a first and a second bus,
    a memory system connected to be read from each of said first and second buses,
    at least one first bus processor connected to said first bus for reading data from said memory system,
    at least one second bus processor connected to said second bus for writing data to said memory system, and
    said first bus processor having a cache memory,
    the method comprising:
        monitoring, by each first bus processor, at least one, but less than all of the lines of the second bus,
        storing, in each connected first bus processor, in its cache, data read from said memory by said processor over said first bus, and
        invalidating data stored in said connected first bus processor cache memory corresponding to an indicated section of the memory system which, from its monitoring of the second bus, could have been changed by a data write command of a said second bus processor.

7. The method of claim 6 further comprising
    monitoring, by each processor, less than all the control lines of the other bus sufficient for determining when a write operation to the memory system occurs, and
    determining what section of the memory system the write operation affected.

8. The method of claim 7 comprising
    monitoring, at each processor, its fully connected bus; and
    updating its cache memory as a result of write operations by other processors able to write on the connected bus.

9. The method of claim 6 wherein said monitoring comprises
    monitoring those lines of the second bus sufficient to determine when a write operation occurs, and
    monitoring at least half of the address lines of the second bus.

10. The method of claim 6 wherein the monitoring comprises monitoring at most three-quarters of the address lines of the second bus.

11. A data processing system comprising a first and a second bus, a memory system connected to be read from each of said first and second buses, at least one first bus processor connected to said first bus for reading data from said memory system, at least one second bus processor connected to said second bus for writing data to said memory system, said memory system having a first cache memory associated with the first bus and a second cache memory associated with the second bus, a first processor element connected to the first bus and connected to monitor at least one, but less than all of the lines of the second bus, and a second processor element connected the second bus and connected to monitor less than all of the lines of the first bus, and said connected first processor element invalidating data stored in its associated cache memory corresponding to an indicated section of the memory system which, from its connections to the second bus, could have been changed by a data write of a said second bus processor.

12. The data processing system of claim 11 further comprising each processor element connected to less than all the control lines of the other bus sufficient for determining when a write operation to the memory system occurs, and what section of the memory system the write operation affected.

13. The data processing system of claim 11 wherein said first processor element is connected to those lines of the second bus sufficient to determine when a write operation occurs, and to at least half of the address lines of the second bus.

14. The data processing system of claim 11 wherein the first processor element is connected to at most three-quarters of the address lines of the second bus.

15. A method for maintaining the integrity of data in a controller cache memory in a data processing system comprising a first and a second bus, a memory system connected to be read from each of said first and second buses, at least one first bus processor connected to said first bus for reading data from said memory system, at least one second bus processor connected to said second bus for writing data to said memory system, and said memory system having a first cache memory associated with the first bus and a second cache memory associated with the second bus, the method comprising:

monitoring, by a first processor element of the memory system, at least one, but less than all of the lines of the second bus, storing, by said first processor element, in its associated cache, data read from said memory over said first bus, and invalidating data stored in said first cache memory corresponding to an indicated section of the memory system which, from its monitoring of the second bus, could have been changed by the write command of the second bus.

16. The method of claim 15 further comprising monitoring, by each processor element, less than all the control lines of the other bus sufficient for determining when a write operation to the memory system occurs, and determining what section bf the memory system the write operation affected.

17. The method of claim 15 wherein said monitoring comprises monitoring those lines of the second bus sufficient to determine when a write operation occurs, and monitoring at least half of the address lines of the second bus.

18. The method of claim 15 wherein the monitoring comprises monitoring at most three-quarters of the address lines of the second bus.

* * * * *